United States Patent
Sano et al.

(10) Patent No.: US 10,828,845 B2
(45) Date of Patent: Nov. 10, 2020

(54) WIRE MATERIAL FOR ELASTIC MEMBER AND ELASTIC MEMBER

(71) Applicant: NHK Spring Co., Ltd., Yokohama-shi (JP)

(72) Inventors: Takamichi Sano, Kanagawa (JP); Kazuhiko Konomi, Kanagawa (JP); Satoshi Okabe, Kanagawa (JP); Masaru Imamura, Kanagawa (JP)

(73) Assignee: NHK Spring Co., Ltd., Yokohama (JP)

( * ) Notice: Subject to any disclaimer, the term of this patent is extended or adjusted under 35 U.S.C. 154(b) by 259 days.

(21) Appl. No.: 15/768,212

(22) PCT Filed: Oct. 28, 2016

(86) PCT No.: PCT/JP2016/082174
§ 371 (c)(1),
(2) Date: Apr. 13, 2018

(87) PCT Pub. No.: WO2017/073773
PCT Pub. Date: May 4, 2017

(65) Prior Publication Data
US 2018/0297297 A1    Oct. 18, 2018

(30) Foreign Application Priority Data
Oct. 29, 2015    (JP) .................................. 2015-213501

(51) Int. Cl.
*B29C 70/16* (2006.01)
*F16F 1/06* (2006.01)
(Continued)

(52) U.S. Cl.
CPC .............. *B29C 70/16* (2013.01); *B29C 53/08* (2013.01); *B29C 53/12* (2013.01); *B29C 70/06* (2013.01);
(Continued)

(58) Field of Classification Search
CPC .......... F16F 1/3665; F16F 1/021; F16F 1/368; F16F 2224/0241; F16F 1/06;
(Continued)

(56) References Cited

U.S. PATENT DOCUMENTS

| 4,473,217 A * | 9/1984 | Hashimoto ........... B21F 35/003 264/165 |
| 5,685,525 A | 11/1997 | Oguri et al. |

(Continued)

FOREIGN PATENT DOCUMENTS

| CA | 1154042 A | 9/1983 |
| CN | 1480658 A | 3/2004 |

(Continued)

OTHER PUBLICATIONS

Office Action dated May 15, 2019, issued for Chinese application No. 201680062789.0 and English translation thereof.
(Continued)

*Primary Examiner* — Pamela Rodriguez
(74) *Attorney, Agent, or Firm* — Locke Lord LLP

(57) ABSTRACT

A wire material for an elastic member includes: inner circumferential-side reinforced fibers that are wound in a spiral form; outer circumferential-side reinforced fibers that are provided on an outer circumference of the inner circumferential-side reinforced fibers; and thermosetting resin that is provided in at least a part of the inner circumferential-side reinforced fibers and the outer circumferential-side reinforced fibers and firmly fixes the reinforced fibers with each other. An angle formed by a winding direction of the inner circumferential-side reinforced fibers and a center axis of the winding is 70° to 110°. A winding direction of the outer circumferential-side reinforced fibers with respect to a center axis of the winding is along a direction of a tensile load applied to the wire material for the elastic member in
(Continued)

accordance with a load applying torsional stress to the wire material for the elastic member as an externally applied load.

9 Claims, 5 Drawing Sheets

(51) Int. Cl.
| | |
|---|---|
| *F16F 1/366* | (2006.01) |
| *B29C 70/06* | (2006.01) |
| *B29C 53/08* | (2006.01) |
| *B29C 53/12* | (2006.01) |
| *F16F 1/02* | (2006.01) |
| *B29L 31/00* | (2006.01) |

(52) U.S. Cl.
CPC ............... *F16F 1/021* (2013.01); *F16F 1/06* (2013.01); *F16F 1/366* (2013.01); *F16F 1/3665* (2013.01); *B29L 2031/7742* (2013.01)

(58) Field of Classification Search
CPC ... F16F 1/1366; F16F 2238/002; B29C 70/06; B29C 53/08; B29C 53/12; B29C 70/16; B29L 2031/7742
USPC .................................. 267/166, 149, 158–160
See application file for complete search history.

(56) References Cited

U.S. PATENT DOCUMENTS 9,212,714 B2 * 12/2015 Shigematsu ............ F16F 1/368
2002/0190451 A1 * 12/2002 Sancaktar ............... B29C 53/12
                                                              267/166
2014/0001688 A1    1/2014 Shigematsu et al.
2019/0063536 A1 *  2/2019 Ono ........................ B29C 70/06

FOREIGN PATENT DOCUMENTS

| CN | 103415722 A | 11/2013 |
|---|---|---|
| DE | 102013016483 A1 | 7/2014 |
| GB | 2056615 A | 3/1981 |
| JP | 55-45076 U | 3/1980 |
| JP | 58-091940 A | 6/1983 |
| JP | 59-144837 A | 8/1984 |
| JP | 60-032539 B2 | 7/1985 |
| JP | S1-017731 A | 1/1986 |
| JP | 3-019140 U | 2/1991 |
| JP | 04-136530 A | 5/1992 |
| JP | 07-042778 A | 2/1995 |
| JP | 2006-226327 A | 8/2006 |

OTHER PUBLICATIONS

Decision to Grant a Patent dated Mar. 12, 2019, issued for the corresponding Japanese patent application No. 2015-213501 and English translation thereof.

International Search Report dated Jan. 31, 2017, issued for PCT/JP2016/082174.

* cited by examiner

WIRE MATERIAL FOR ELASTIC MEMBER AND ELASTIC MEMBER

FIELD

The present invention relates to a wire material for an elastic member, and an elastic member.

BACKGROUND

Conventionally, reduction of various components in weight has been pursued as one method for improving fuel consumption of automobiles. For example, an aluminum alloy has been used instead of cast iron as material for engine blocks and a magnesium alloy has been used instead of steel as material for engine covers and oil pans.

In recent years, from the viewpoint of reduction of automobiles in weight, for example, elastic members such as coil springs as suspension springs for suspension are considered for reduction in weight. Examples of wire materials for elastic members that can reduce the elastic members in weight include wire materials for elastic members that have fibers such as carbon fibers wound around a core member and a fiber reinforced resin layer made of resin (for example, see Patent Documents 1 to 3).

Patent Document 1 discloses a wire material for an elastic member that uses aluminum as a core member and has a carbon fiber reinforced resin layer formed by winding fibers around the outer circumference of the aluminum core member in a mesh manner. The winding of the fibers around the core member in the mesh manner as disclosed in Patent Document 1 is however easy to cause buckling breakage of the fibers when torsional stress is applied thereto and the diameter of the wire material is therefore required to be increased in order to ensure strength. Due to the increase in the diameter of the wire material, a sufficient weight reduction effect and a necessary deflection amount cannot be provided and there is the risk that the coil spring does not exert its function.

To cope with this, Patent Document 2 discloses a wire material for an elastic member that is formed by winding fibers around a core member with a predetermined angle with respect to the axial direction of the core member, as a technique of improving strength against torsional stress. Furthermore, Patent Document 3 discloses that when a wire material for an elastic member is wound to form a coil spring, the orientation direction of fibers with respect to the axial direction of a core member is the direction with which shearing acting on the coil spring in a usage state applies tension force to the fibers.

CITATION LIST

Patent Literature

Patent Literature 1: Japanese Utility Model Application Publication No. S55-45076
Patent Literature 2: Japanese Patent Application Laid-open No. 2006-226327
Patent Literature 3: Japanese Utility Model Application Publication No. H3-19140

SUMMARY

Technical Problem

However, with regard to the wire material for the elastic member disclosed in Patent Document 2 or 3, breakage of the wire material due to diameter contraction with a torsional load that is applied by compression of a coil spring when the wire material for the elastic member is wound to form the coil spring is not considered. For this reason, the diameter contraction of the wire material occurs depending on the material of the core member, and the strength and rigidity of the coil spring are lowered. Consequently, characteristics desired for the coil spring cannot be provided in some cases.

The present invention has been made in view of the above-described circumstances and an object thereof is to provide a wire material for an elastic member and the elastic member that can achieve reduction in weight and improvement in strength.

Solution to Problem

To solve the above-described problem and achieve the object, a wire material for an elastic member for producing an elastic member according to the present invention includes: inner circumferential-side reinforced fibers that are wound in a spiral form; outer circumferential-side reinforced fibers that are provided on an outer circumference of the inner circumferential-side reinforced fibers; and thermosetting resin that is provided in at least a part of the inner circumferential-side reinforced fibers and the outer circumferential-side reinforced fibers and firmly fixes the reinforced fibers with each other, wherein an angle formed by a winding direction of the inner circumferential-side reinforced fibers and a center axis of the winding is 70° to 110°, and a winding direction of the outer circumferential-side reinforced fibers with respect to a center axis of the winding is along a direction of a tensile load that is applied to the wire material for the elastic member in accordance with a load applying torsional stress to the wire material for the elastic member as an externally applied load.

Moreover, in the wire material for an elastic member according to the present invention, an angle formed by the center axis of the winding of the outer circumferential-side reinforced fibers and the winding direction of the outer circumferential-side reinforced fibers is 40° to 50°.

Moreover, in the wire material for an elastic member according to the present invention, rigidity of the wire material for the elastic member is equal to or higher than 9 GPa.

Moreover, in the wire material for an elastic member according to the present invention, a ratio of a thickness of an outer circumferential-side reinforced fiber layer containing the outer circumferential-side reinforced fibers relative to a thickness of an inner circumferential-side reinforced fiber layer containing the inner circumferential-side reinforced fibers is equal to or higher than 0.5.

Moreover, in the wire material for an elastic member according to the present invention, a static torsional strength of the wire material for the elastic member is equal to or higher than 540 MPa.

Moreover, the wire material for an elastic member according to the present invention further includes a core member that is provided at an inner circumferential side of a tubular inner circumferential-side reinforced fiber layer formed by the inner circumferential-side reinforced fibers and is formed using an elastically deformable material.

Moreover, in the wire material for an elastic member according to the present invention, the core member and the wire material for the elastic member have circular cross sections and a plane orthogonal to a lengthwise axis is a cutting surface, and the angle formed by the winding direction of the inner circumferential-side reinforced fibers and the center axis of the winding is 80° to 100°.

Moreover, an elastic member according to the present invention is formed by using the wire material for an elastic member according to the above-described invention.

Moreover, in the above-described elastic member according to the present invention, the elastic member is formed by winding the wire material for an elastic member in a spiral manner.

Moreover, in the above-described elastic member according to the present invention, the elastic member is a suspension spring for an automobile.

Advantageous Effects of Invention

The present invention provides effects of achieving reduction in weight and improvement in strength.

DESCRIPTION OF EMBODIMENTS

Hereinafter, a mode (hereinafter, referred to as an "embodiment") for carrying out the present invention will be described with reference to the accompanying drawings. The drawings are schematic, and relations between the thicknesses and the widths of respective portions, ratios of the thicknesses of the respective portions, and the like are different from actual ones in some cases, and there are portions with different dimensional relations and ratios among the drawings in some cases.

Figure 1:
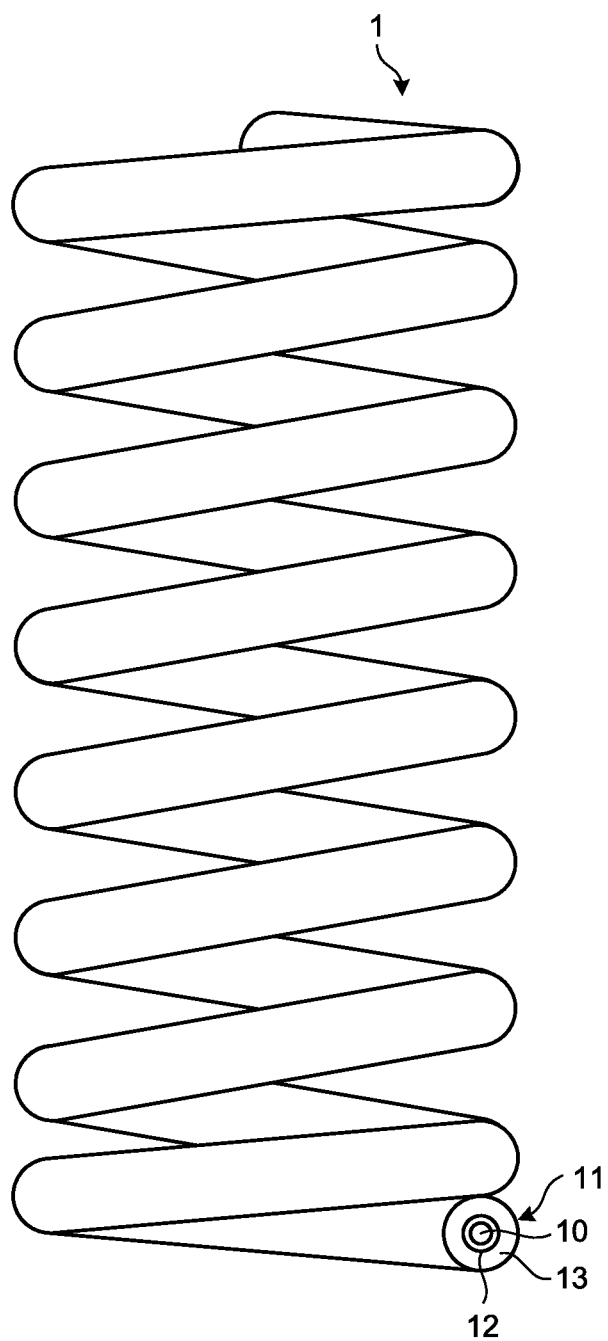
FIG. 1 is a schematic plan view illustrating the configuration of a coil spring according to an embodiment of the present invention.
Figure 2:
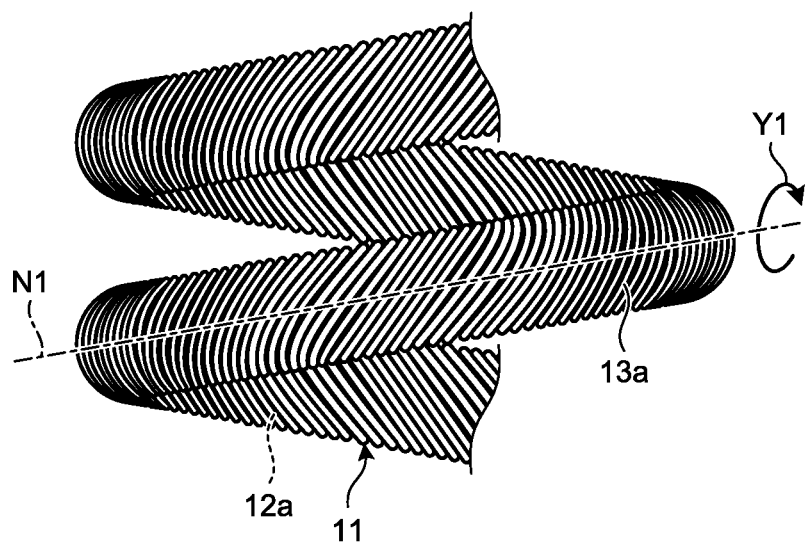
FIG. 2 is a schematic plan view illustrating the configuration of a main part of the coil spring in the embodiment of the present invention.
Figure 3:
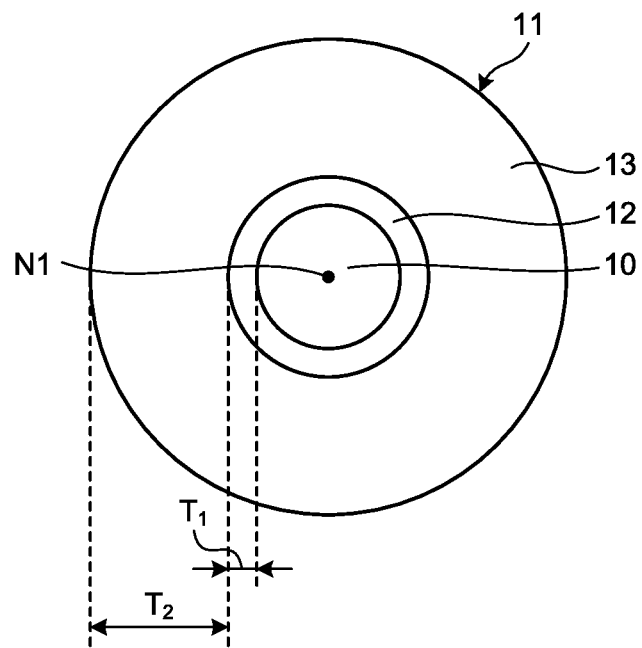
FIG. 3 is a schematic plan view illustrating the configuration of the main part of the coil spring in the embodiment of the present invention.

FIG. 1 is a schematic plan view illustrating the configuration of a coil spring according to an embodiment of the present invention. FIG. 2 is a schematic plan view illustrating the configuration of a main part of the coil spring in the embodiment of the present invention. FIG. 3 is a schematic plan view illustrating the configuration of the main part of the coil spring in the embodiment of the present invention and is a plan view when seen from an extension direction of a wire material. A coil spring 1 is produced by coiling, in a spiral form, a wire material formed by winding fibers around a core member. The coil spring 1 is expandable in a predetermined direction (for example, an extension direction by coiling). The coil spring 1 is used as, for example, a suspension spring for suspension of an automobile.

The coil spring 1 has a core member 10 made of an elastically deformable material and a fiber reinforced plastic (FRP) layer 11 containing a plurality of fibers that are wound around the core member 10 and covers the core member 10, and is formed into a spiral shape. The coil spring 1 is preferably formed by the wire material that has rigidity of equal to or higher than 9 GPa and equal to or lower than 50 GPa and has static torsional strength of equal to or higher than 540 MPa and equal to or lower than 2000 MPa as strength when the coil spring 1 is used as the suspension spring.

As illustrated in FIGS. 2 and 3, the FRP layer 11 has a tubular inner circumferential-side reinforced fiber layer 12 formed by winding a plurality of inner circumferential-side reinforced fibers 12a and a tubular outer circumferential-side reinforced fiber layer 13 formed by winding outer circumferential-side reinforced fibers 13a. The FRP layer 11 is formed by winding the inner circumferential-side reinforced fibers 12a and the outer circumferential-side reinforced fibers 13a around the core member 10, impregnating it with unhardened thermosetting resin, and heating and hardening it. Alternatively, the FRP layer 11 is formed by winding the inner circumferential-side reinforced fibers 12a impregnated with the unhardened thermosetting resin around the core member 10, winding the outer circumferential-side reinforced fibers 13a at the outer circumferential side of the inner circumferential-side reinforced fibers 12a, and heating and hardening it to form the respective layers. At least one fiber selected from carbon fibers, glass fibers, aramid fibers as aromatic polyamide fibers, and basalt fibers as basaltic fibers are used for each of the inner circumferential-side reinforced fibers 12a and the outer circumferential-side reinforced fibers 13a. In the FRP layer 11, at least parts of the reinforced fibers are firmly fixed to each other with the thermosetting resin. That is to say, the FRP layer 11 contains the above-mentioned inner circumferential-side reinforced fibers 12a, the outer circumferential-side reinforced fibers 13a, and the thermosetting resin for fixing the inner circumferential-side reinforced fibers 12a to each other, for fixing the outer circumferential-side reinforced fibers 13a to each other, and/or for fixing the inner circumferential-side reinforced fibers 12a and the outer circumferential-side reinforced fibers 13a to each other. Resin that has insulating properties and is hardened with heat, for example, epoxy resin is used as the thermosetting resin.

The inner circumferential-side reinforced fibers 12a and the outer circumferential-side reinforced fibers 13a in the FRP layer 11 may be wound around the core member 10 one by one, or may be wound around the core member 10 by bundling a plurality of fibers into a bundle or by bundling a plurality of bundles. The fiber winding directions of the inner circumferential-side reinforced fibers 12a and the outer circumferential-side reinforced fibers 13a are made uniform in either of the winding manners. Furthermore, a sheet-like fiber bundle may be provided on the outer surface of the core member 10 in a state in which the lengthwise directions of the fibers are made uniform. One or more (including a fiber bundle) of each of the inner circumferential-side reinforced fibers 12a and the outer circumferential-side reinforced fibers 13a are wound in the radial direction of the wire material.

It is preferable that the inner circumferential-side reinforced fibers 12a and the outer circumferential-side reinforced fibers 13a be continuous from one end to the other end of the wire material extending in a spiral manner from the viewpoint of improvement in the strength of the coil spring 1 (FRP layer 11). When at least one of the inner circumferential-side reinforced fibers 12a and the outer circumferential-side reinforced fibers 13a are non-continuous, the wire material as a whole cannot bear an externally applied load, and stress concentrates on a non-continuous portion, which then becomes the origin for the wire material to break easily. When the inner circumferential-side reinforced fibers 12a and the outer circumferential-side reinforced fibers 13a are continuous from the one end to the other end of the wire material, the respective reinforced fibers extend from the one end to the other end of the wire material in a spiral manner and are continuous along the circumferential direction around the core member 10.

The coil spring 1 preferably has the rigidity of equal to or higher than 9 GPa and/or the static torsional strength of equal to or higher than 540 MPa in order to improve fatigue strength of the wire material and ensure the strength of the coil spring that is used for the suspension or the like. In the case in which the coil spring 1 satisfies the above-mentioned rigidity, when the thickness of the inner circumferential-side reinforced fiber layer 12 is $T_1$ and the thickness of the outer circumferential-side reinforced fiber layer 13 is $T_2$, a ratio $T_2/T_1$ of the thickness $T_2$ of the outer circumferential-side reinforced fiber layer 13 relative to the thickness $T_1$ of the inner circumferential-side reinforced fiber layer 12 is equal to or higher than 0.5 and equal to or lower than 20. The "thickness" referred herein is the width of each reinforced fiber layer in the direction orthogonal to the center axis of the layer.

Preferably, the winding direction (direction in which the inner circumferential-side reinforced fibers 12a extend) in which the inner circumferential-side reinforced fibers 12a are wound around the core member 10 is substantially orthogonal to the extension direction (lengthwise direction) of the wire material in order to prevent diameter contraction of the wire material of the coil spring 1. An angle range thereof is equal to or larger than 70° and equal to or smaller than 110°, preferably equal to or larger than 80° and equal to or smaller than 100° with respect to the lengthwise axis (for example, an axis N1 illustrated in FIG. 2) of the wire material. The angle formed by the winding direction and the lengthwise axis is an angle when seen from the direction orthogonal to the lengthwise axis and the direction in which the reinforced fibers extend. The lengthwise axis forms a spiral manner along the wire material actually forming the coil spring 1.

Figure 4A:
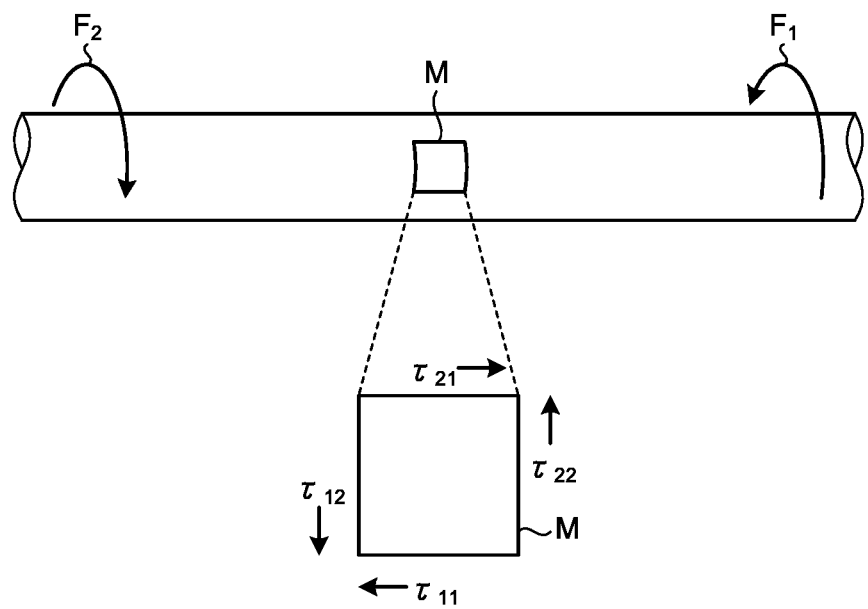
FIG. 4A is a schematic plan view illustrating the configuration of the main part of the coil spring in the embodiment of the present invention.
Figure 4B:
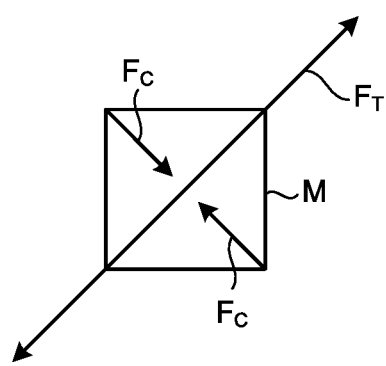
FIG. 4B is a schematic plan view illustrating the configuration of the main part of the coil spring in the embodiment of the present invention.

A winding direction Y1 (direction in which the outer circumferential-side reinforced fibers 13a extend) in which the outer circumferential-side reinforced fibers 13a are wound around the core member 10 extends along the direction of a tensile load out of the tensile load and a compression load as loads that are applied to the wire material when a load of compressing the coil spring 1 is applied externally. FIGS. 4A and 4B are schematic plan views illustrating the configuration of the main part of the coil spring in the embodiment of the present invention and are views for explaining the loads that are applied to the surface of the wire material when torsional stress is applied to the coil spring 1. When the torsional stress with loads $F_1$ and $F_2$ in the opposite directions as loads about the center axis of the wire material is applied to the coil spring 1 (wire material), shearing stresses $\tau_{12}$, $\tau_{21}$, and $\tau_{22}$ illustrated in FIG. 4A are applied to a rectangular fine region M on the surface of the wire material. Application of the shearing stresses $\tau_{11}$, $\tau_{12}$, $\tau_{21}$, and $\tau_{22}$ to the wire material is, in other words, application of a tensile load $F_T$ and a compression load $F_C$ to the fine region M illustrated in FIG. 4B. The direction in which the tensile load $F_T$ is applied is theoretically 45° with respect to the lengthwise axis (axis N1) of the wire material but an angle range thereof is equal to or larger than 40° and equal to or smaller than 50° in consideration of variations in the shape of the wire material, and the like.

The winding direction Y1 of the outer circumferential-side reinforced fibers 13a in the embodiment is the direction along the above-mentioned tensile load $F_T$ and all of them are preferably wound along the tensile load $F_T$. It should be noted that winding angles of the inner circumferential-side reinforced fibers 12a and the outer circumferential-side reinforced fibers 13a may be partially different from each other but they are preferably wound around the core member 10 with a constant winding angle. The "constant winding angle" referred herein contains errors of the winding angle in manufacturing.

Figure 5:
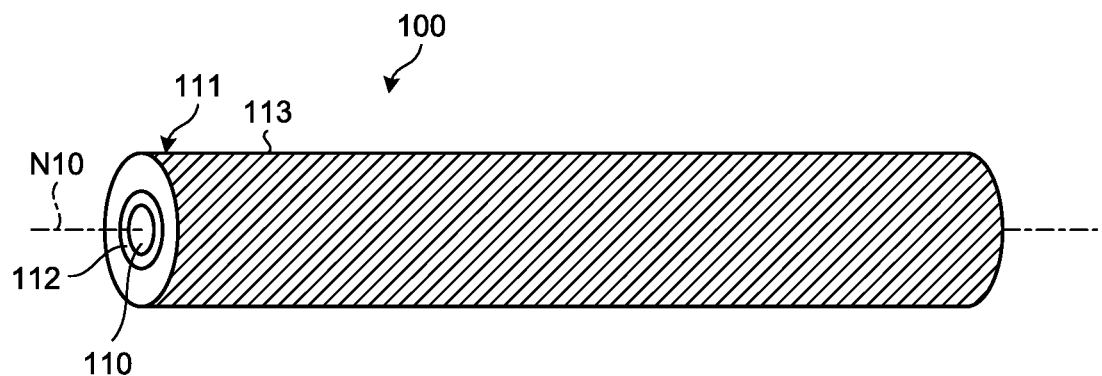
FIG. 5 is a schematic plan view illustrating the configuration of a wire material for an elastic member for producing the coil spring in the embodiment of the present invention.

FIG. 5 is a schematic plan view illustrating the configuration of a wire material for an elastic member as a wire material for producing the coil spring 1. A wire material for an elastic member 100 (hereinafter, simply referred to as a "wire material 100") illustrated in FIG. 5 includes a columnar core member 110 made of the same material as the core member 10 and an FRP layer 111 that is provided by forming an inner circumferential-side reinforced fiber layer and an outer circumferential-side reinforced fiber layer by winding inner circumferential-side reinforced fibers 112 made of the same fibers as the inner circumferential-side reinforced fibers 12a around the outer circumference of the core member 110 and winding outer circumferential-side reinforced fibers 113 made of the same fibers as the outer circumferential-side reinforced fibers 13a around the outer circumference of the inner circumferential-side reinforced fibers 112, and is formed into a columnar shape of a three-layered structure. The inner circumferential-side reinforced fibers 112 that are wound around the core member 110 and the outer circumferential-side reinforced fibers 113 that are wound around the inner circumferential-side reinforced fibers 112 may be previously impregnated with liquid-state thermosetting resin or may be wound therearound, and then, be impregnated with the thermosetting resin.

Figure 6:
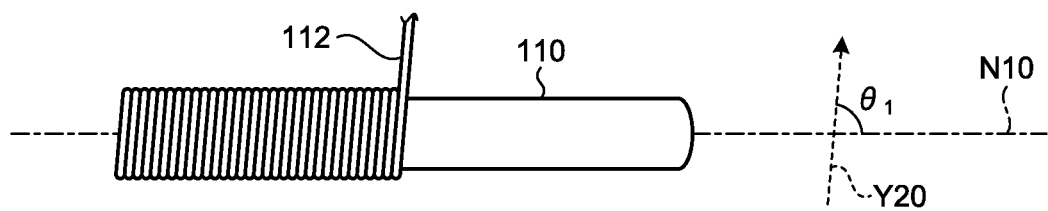
FIG. 6 is a view for explaining a method for producing the wire material of the elastic member in the embodiment of the present invention.
Figure 7:
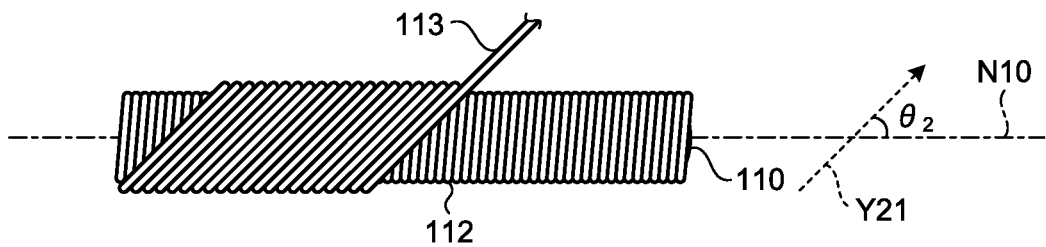
FIG. 7 is a view for explaining the method for producing the wire material for the elastic member in the embodiment of the present invention.

Subsequently, a method for producing the wire material 100 will be described with reference to FIG. 6 and FIG. 7. FIG. 6 and FIG. 7 are views for explaining the method for producing the wire material for the elastic member in the embodiment of the present invention. First, the inner circumferential-side reinforced fibers 112 that have been previously impregnated with the liquid-state thermosetting resin are wound around the core member 110 (see FIG. 6). An angle $\theta_1$ formed by a winding direction Y20 (direction in which the inner circumferential-side reinforced fibers 112 extend) in which the inner circumferential-side reinforced fibers 112 are wound around the core member 110 and the lengthwise axis (for example, an axis N10 illustrated in FIG. 5) of the core member 110 is equal to or larger than 70° and equal to or smaller than 110°.

Thereafter, the inner circumferential-side reinforced fibers 113 that have been impregnated with the thermosetting resin are wound around the inner circumferential-side reinforced fibers 112 (see FIG. 7). A winding direction Y21 (direction in which the outer circumferential-side reinforced fibers 113 extend) in which the outer circumferential-side reinforced fibers 113 are wound around the core member 110 is along the direction of the above-mentioned tensile load when, for example, a load is assumed to be externally applied to the coil spring 1 produced by coiling the wire material 100 in a spiral manner. To be specific, the winding direction Y21 in which the outer circumferential-side reinforced fibers 113 are wound around the inner circumferential-side reinforced fibers 112 is set such that an angle $\theta_2$ formed by the winding direction Y21 and the axis N10 is in a range of $40°<\theta_2\leq50°$ when seen from the direction orthogonal to the lengthwise axis (axis N10) of the core member 110. The angle $\theta_2$ corresponds to an angle formed by the direction of the tensile load that is applied to the outer circumferential-side reinforced fibers 113 in accordance with the above-mentioned torsional stress and the center axis (axis N10) of the core member 110. For example, a filament winding method is used as a method for winding the inner circumferential-side reinforced fibers 112 around the core member 110 and a method for winding the outer circumferential-side reinforced fibers 113 around the inner circumferential-side reinforced fibers 112. When a reinforced fiber bundle provided by forming the reinforced fibers into a sheet-like shape is used, formation by a sheet winding method can also be employed.

After the outer circumferential-side reinforced fibers 113 are wound, the provided product is heated to equal to or higher than a temperature hardening the thermosetting resin, thereby providing the wire material 100 in which the inner circumferential-side reinforced fibers 112 are firmly fixed to each other, the outer circumferential-side reinforced fibers 113 are firmly fixed to each other, and/or the inner circumferential-side reinforced fibers 112 and the outer circumferential-side reinforced fibers 113 are firmly fixed to each other.

As described above, it is preferable that the rigidity of the wire material 100 be equal to or higher than 9 GPa and the static torsional strength of the wire material 100 be equal to or higher than 540 MPa as the strength when the wire material 100 is used as the wire material for the suspension spring.

The above-mentioned coil spring 1 can be produced by winding the wire material 100. The wire material 100 can also be used for elastic members such as a torsion bar and a stabilizer formed by bending a part of it in addition to the above-mentioned coil spring 1.

According to the embodiment of the present invention described above, the coil spring 1 includes the elastically deformable core member 10 and the FRP layer 11 that is formed by the inner circumferential-side reinforced fibers 12a wound around the core member 10, the outer circumferential-side reinforced fibers 13a wound around the inner circumferential-side reinforced fiber layer 12 containing the inner circumferential-side reinforced fibers 12a, and the thermosetting resin fixing the reinforced fibers firmly, and covers the outer surface of the core member 10, wherein the inner circumferential-side reinforced fibers 12a are wound so as to make the winding direction thereof with respect to the lengthwise axis (axis N1) of the core member 10 be equal to or larger than 80° and equal to or smaller than 100°, and the outer circumferential-side reinforced fibers 13a are wound so as to make the winding direction around the core member 10 be along the direction of the tensile load that is applied to the wire material in accordance with the torsional stress. With this configuration, the coil spring 1 having strength with resistance to the torsional stress and reduced in weight can be provided. In the embodiment of the present invention, when the core member 10 is made of, for example, aluminum, an alloy thereof, or resin, the coil spring can be reduced in weight by approximately 60% in comparison with a coil spring made of an iron-based material such as cast iron while having the same characteristics or the same volume.

Although the core member 10 is provided at the inner circumferential side of the inner circumferential-side reinforced fiber layer 12 in the embodiment of the present invention, the embodiment may be a structure in which the core member 10 is not included because the inner circumferential-side reinforced fiber layer 12 can prevent the diameter contraction of the wire material. That is to say, the hollow coil spring 1 (wire material for the elastic member) may be formed by only the FRP layer 11 having the inner circumferential-side reinforced fiber layer 12, the outer circumferential-side reinforced fiber layer 13, and the thermosetting resin firmly fixing these reinforced fibers.

EXAMPLES

Hereinafter, examples of the wire material for the elastic member for producing the coil spring according to the present invention will be described. It should be noted that the present invention is not limited by these examples. First, the configuration of the wire material for the elastic member in each of the examples will be described.

Example 1

A bar-shaped polypropylene (PP) resin material was used as a core member and tow prepreg as a carbon fiber bundle containing epoxy resin was used as inner circumferential-side reinforced fibers and outer circumferential-side reinforced fibers.

A wire material for an elastic member was formed by winding the tow prepreg around the core member. First, the inner circumferential-side reinforced fibers were wound so as to form 90° with respect to the lengthwise axis of the core member when seen from the direction orthogonal to the lengthwise axis of the core member. The outer circumferential-side reinforced fibers were wound so as to form 45° with respect to the lengthwise axis of the core member when seen from the direction orthogonal to the lengthwise axis of the core member until a ratio between the thickness of an outer circumferential-side reinforced fiber layer and the thickness of an inner circumferential-side reinforced fiber layer became 4:1. Thereafter, the epoxy resin was hardened and the provided wire material was used as a wire material for an elastic member in Example 1.

Example 2

The same operations as those in Example 1 were performed excluding the point that the winding angle of the inner circumferential-side reinforced fibers with respect to the lengthwise axis of the core member was set to 80°.

Example 3

The same operations as those in Example 2 were performed excluding the point that the ratio between the thickness of the outer circumferential-side reinforced fiber layer and the thickness of the inner circumferential-side reinforced fiber layer was set to 3:2.

Example 4

The same operations as those in Example 2 were performed excluding the point that the ratio between the thickness of the outer circumferential-side reinforced fiber layer and the thickness of the inner circumferential-side reinforced fiber layer was set to 2:3.

Example 5

The same operations as those in Example 1 were performed excluding the point that the winding angle of the inner circumferential-side reinforced fibers with respect to the lengthwise axis of the core member was set to 100°.

Example 6

The same operations as those in Example 1 were performed excluding the point that the winding angle of the inner circumferential-side reinforced fibers with respect to the lengthwise axis of the core member was set to 70°.

Comparative Example 1

A bar-shaped polypropylene (PP) resin material was used as a core member and tow prepreg as a carbon fiber bundle was used as reinforced fibers.

Figure 8:
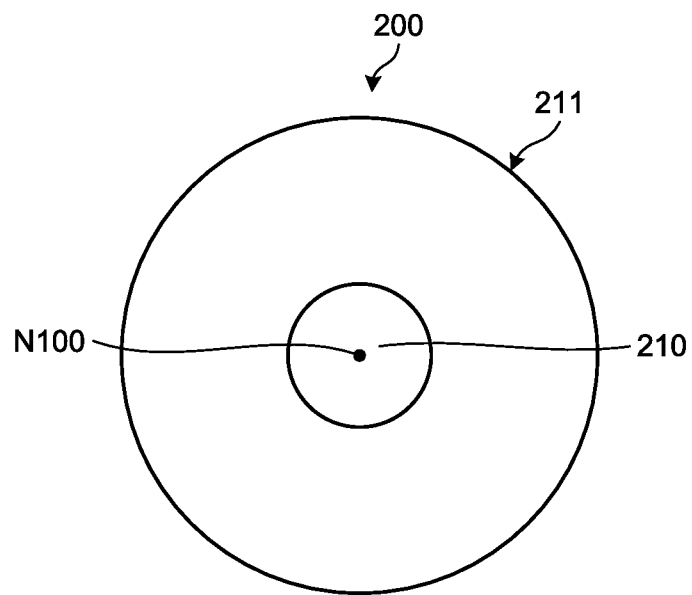
FIG. 8 is a schematic plan view for explaining the configuration of a coil spring according to a comparative example of an example of the present invention.

A wire material for an elastic member was formed by winding the tow prepreg around the above-mentioned core member using a filament winder. In this case, the reinforced fibers were wound so as to form 45° with respect to the lengthwise axis of the core member when seen from the direction orthogonal to the lengthwise direction of the core member until the thickness of an outer circumferential-side reinforced fiber layer became equivalent to the sum of the thickness of the inner circumferential-side reinforced fiber layer and the thickness of the outer circumferential-side reinforced fiber layer in Example 1, that is, a ratio between the thickness of the outer circumferential-side reinforced fiber layer and the thickness of an inner circumferential-side reinforced fiber layer became 5:0. Thereafter, epoxy resin was hardened and the provided wire material was used as a wire material for an elastic member in Comparative Example 1. FIG. 8 is a schematic plan view for explaining the configuration of a coil spring in the comparative example of the example of the present invention. As illustrated in FIG. 8, a wire material for an elastic member 200 in Comparative Example 1 includes a core member 210, and an FRP layer 211 formed by reinforced fibers wound around the core member 210. The wire material for the elastic member 200 was formed by winding the reinforced fibers so as to form 45° with respect to a lengthwise axis N100 of the core member 210.

Comparative Example 2

The same operations as those in Example 2 were performed excluding the point that the ratio between the thickness of the outer circumferential-side reinforced fiber layer and the thickness of the inner circumferential-side reinforced fiber layer was set to 1:4.

Comparative Example 3

The same operations as those in Example 1 were performed excluding the point that the winding angle of the inner circumferential-side reinforced fibers with respect to the lengthwise axis of the core member was set to 60°.

In Examples 1 to 6 and Comparative Examples 1 to 3 described above, the diameters of the core members and the outer diameters of the wire materials for the elastic members are the same.

Subsequently, experiment contents related to the examples will be described.

Torsional Breakage Strength Test

A torsion test was performed while a strain gauge was bonded and a rotating speed about the center axis of the wire material was set to 0.3°/sec. A torsional breakage strength (static torsional strength) of the wire material (carbon fibers) was obtained with the torsion test.

Rigidity

Rigidity was calculated on the basis of the inclination of a stress-strain chart provided by the above-mentioned torsion test.

Table 1 indicates characteristics of the wire materials for the elastic members in the examples and torsion test results (torsional breakage strength and rigidity). It should be noted that a thickness ratio is the ratio between the outer circumferential-side reinforced fiber layer and the inner circumferential-side reinforced fiber layer. Furthermore, a fiber content is the volume content of the reinforced fibers in the FRP layer.

TABLE 1

| | Winding angle | | Layer thickness ratio between outer circumferential side and inner circumferential side | Fiber content (%) | Torsional breakage strength (MPa) | Rigidity (GPa) |
| --- | --- | --- | --- | --- | --- | --- |
| | Outer circumferential-side reinforced fibers | Inner circumferential-side reinforced fibers | | | | |
| Example 1 | 45 | 90 | 4:1 | 56 | 600 | 10.3 |
| Example 2 | 45 | 80 | 4:1 | 55 | 580 | 10.2 |
| Example 3 | 45 | 80 | 3:2 | 55 | 580 | 9.9 |
| Example 4 | 45 | 80 | 2:3 | 55 | 570 | 9.5 |
| Example 5 | 45 | 100 | 4:1 | 55 | 570 | 9.1 |
| Example 6 | 45 | 70 | 4:1 | 55 | 540 | 9 |
| Comparative example 1 | 45 | — | 5:0 | 57 | 450 | 8.5 |
| Comparative example 2 | 45 | 80 | 1:4 | 54 | 480 | 8.7 |
| Comparative example 3 | 45 | 60 | 4:1 | 55 | 490 | 8.6 |

In each of Examples 1 to 6 for the wire material for the elastic member having the inner circumferential-side reinforced fibers and the outer circumferential-side reinforced fibers, both of the rigidity and the torsional breakage strength are higher than those in Comparative Example 1 in which the reinforced fibers are wound in a constant direction, as indicated in Table 1. The wire material in each of Examples 1 and 2 has high rigidity and high torsional breakage strength. As a result, a practical coil spring can be provided by using the wire material.

When the above-mentioned coil spring 1 is used for the suspension spring for the suspension, the wire material for the elastic member for producing the coil spring 1 is desired to have, for example, the rigidity of equal to or higher than 9 GPa and the static torsional strength of equal to or higher than 540 MPa. The results of the examples indicate that the wire material for the elastic member in each of Examples 1 to 6 sufficiently satisfies requirements as the wire material for the coil spring 1 for the suspension.

As described above, the present invention can encompass various embodiments and the like that are not described herein. Various design changes and the like can be made in a range without departing from a technical spirit that is specified by the scope of the invention.

INDUSTRIAL APPLICABILITY

As described above, a wire material for an elastic member and the elastic member according to the present invention are suitable for reduction in weight and improvement in strength.

REFERENCE SIGNS LIST

1 COIL SPRING
10, 110 CORE MEMBER
11, 111 FIBER REINFORCED PLASTIC (FRP) LAYER
12 INNER CIRCUMFERENTIAL-SIDE REINFORCED FIBER LAYER
12a, 112 INNER CIRCUMFERENTIAL-SIDE REINFORCED FIBER
13 OUTER CIRCUMFERENTIAL-SIDE REINFORCED FIBER LAYER
13a, 113 OUTER CIRCUMFERENTIAL-SIDE REINFORCED FIBER
100, 200 WIRE MATERIAL FOR ELASTIC MEMBER

The invention claimed is:

1. A wire material for an elastic member for producing an elastic member, the wire material comprising:
   inner circumferential-side reinforced fibers that are wound in a spiral form;
   outer circumferential-side reinforced fibers that are provided on an outer circumference of the inner circumferential-side reinforced fibers; and
   thermosetting resin that is provided in at least a part of the inner circumferential-side reinforced fibers and the outer circumferential-side reinforced fibers and firmly fixes the reinforced fibers with each other, wherein
   an angle formed by a winding direction of the inner circumferential-side reinforced fibers and a center axis of the winding is 70° to 110°, and
   an angle formed by the center axis of the winding of the outer circumferential-side reinforced fibers and the winding direction of the outer circumferential-side reinforced fibers is 40° to 50°.

2. The wire material for the elastic member according to claim 1, wherein rigidity of the wire material for the elastic member is equal to or higher than 9 GPa.

3. The wire material for the elastic member according to claim 1, wherein a ratio of a thickness of an outer circumferential-side reinforced fiber layer containing the outer circumferential-side reinforced fibers relative to a thickness of an inner circumferential-side reinforced fiber layer containing the inner circumferential-side reinforced fibers is equal to or higher than 0.5.

4. The wire material for the elastic member according to claim 1, wherein a static torsional strength of the wire material for the elastic member is equal to or higher than 540 MPa.

5. The wire material for the elastic member according to claim 1, further including a core member that is provided at an inner circumferential side of a tubular inner circumferential-side reinforced fiber layer formed by the inner circumferential-side reinforced fibers and is formed using an elastically deformable material.

6. The wire material for the elastic member according to claim 5, wherein
   the core member and the wire material for the elastic member have circular cross sections and a plane orthogonal to a lengthwise axis is a cutting surface, and
   the angle formed by the winding direction of the inner circumferential-side reinforced fibers and the center axis of the winding is 80° to 100°.

7. An elastic member that is formed by using the wire material for an elastic member according to claim 1.

8. The elastic member according to claim 7, wherein the elastic member is formed by winding the wire material for an elastic member in a spiral manner.

9. The elastic member according to claim 8, wherein the elastic member is a suspension spring for an automobile.

* * * * *